United States Patent [19]

Wyslotsky

[11] Patent Number: 4,791,303
[45] Date of Patent: Dec. 13, 1988

[54] METHODS AND APPARATUS FOR LAMINATING POLYMERIC SHEET MATERIAL

[75] Inventor: Ihor Wyslotsky, Chicago, Ill.

[73] Assignee: Biflex Development Partners, Ltd., Grand Rapids, Mich.

[21] Appl. No.: 41,874

[22] Filed: Apr. 22, 1987

Related U.S. Application Data

[63] Continuation-in-part of Ser. No. 662,570, Oct. 19, 1984, abandoned.

[51] Int. Cl.⁴ .................... G21G 5/00; G21K 5/00
[52] U.S. Cl. ........................ 250/492.1; 156/379.6
[58] Field of Search ............ 250/400, 492.3, 492.1, 250/324-326; 156/272.6, 379.6; 204/165; 264/22, 25

[56] References Cited

U.S. PATENT DOCUMENTS

| | | | |
|---|---|---|---|
| 3,391,044 | 7/1968 | Kaghan et al. | 156/272.6 X |
| 3,870,610 | 3/1975 | Baird et al. | 204/165 |
| 4,511,419 | 4/1985 | Kuhlmann et al. | 156/272.6 |

FOREIGN PATENT DOCUMENTS

0193370 11/1983 Japan .................. 156/272.6

Primary Examiner—Eugene R. LaRoche
Assistant Examiner—Seung Ham
Attorney, Agent, or Firm—Robert Ward

[57] ABSTRACT

The present invention concerns methods and apparatus for laminating polymeric sheet materials wherein the use of a separate adhesive and/or the use of heat as a bonding means are avoided. In particular, methods and apparatus are disclosed wherein at least one polymeric sheet is exposed to a flowing of gaseous cold plasma to form free radicals on the surface thereof. Said free radicals serve to effect bonding upon application of such treated polymeric sheet to a second polymeric sheet. In preferred embodiments, approximately 180,000 to 500,000 volts of electromagnetic energy are applied to a stream of gaseous material, such as argon gas, and utilizing a radio wave frequency discharge of approximately 12.56 megaHertz. In some preferred embodiments, the cold plasma may be applied at an effective pressure of approximately 1.1 Torr in the reaction area.

33 Claims, 5 Drawing Sheets

METHODS AND APPARATUS FOR LAMINATING POLYMERIC SHEET MATERIAL

BACKGROUND OF THE INVENTION

The present application is a continuation-in-part of application Ser. No. 662,570 (now abandoned), filed on Oct. 19, 1984.

The present invention is directed to methods and apparatus for laminating polymeric sheet material in the absence of application of a separate adhesive and/or application of heat, and in particular is directed to methods and apparatus for effectuating the lamination of at least two polymeric sheets utilizing application of gaseous cold plasma, preferably comprising cold argon plasma, to effectuate such adhesiveless bonding through the generation of free radicals, and also in the substantial avoidance of any melting or heat degradation of such polymeric properties thereof in strength, stability, etc.

It has been desirable in the packaging arts, and particularly in the packaging of comestibles to utilize clear polymeric materials for visual observation of the particular food product being displayed, in order to enhance the marketability thereof and to provide the consumer with a full opportunity to observe the condition of the food product. Unfortunately, certain polymeric materials have had properties rendering such materials desirable for some necessary aspects of packaging, but have had properties which were less than optimal in other areas. Specifically, for example, some polymeric sheet materials have permitted excellent transparency, but have been lacking in barrier protection against the infusion of oxygen and/or moisture from the atmosphere, etc. Thus, it has been desirable to utilize two or more polymeric sheet materials bonded together in the form of a laminate in order to achieve the hybridized or synthesized properties of several different polymeric sheet materials. As a further example, some polymeric sheet materials have been excellent in their performance as barrier materials, but have lacked printability on the surface thereof, which has been detrimental to their use as packaging material.

In formulating such laminated materials, two basic prior art techniques have been principally utilized. In one technique, adhesive has been used as a lamination material between two separate sheets of different polymeric materials. A number of disadvantages and/or deficiencies have been associated with the use of adhesives for this purpose. Such adhesives have resulted in a relatively high scrap rate, comprising between in some instances 5% and 25%. Also, such prior art adhesive lamination has rendered necessary in most instances the presence of solvents or unreacted monomers, which has introduced another area of uncertainty, pursuant inter alia to Food and Drug Administration rules and regulations regarding toxicity, into packaging which has been proposed to be particularly utilizable for the packaging of comestibles. In addition, the machinery which has been developed for use in adhesively bonding together polymeric sheets to form such laminates has been relatively costly, and has involved high depreciation costs and excessive maintenance attention.

Another form of laminate formation has been the hot co-extrusion of two different webs of polymeric materials, and/or application of a layer of heat melt adhesive, such that two or more webs are joined by such heat lamination. Such heat utilization techniques have resulted in relatively high scrap levels for relatively short runs of laminate material. The capital outlays have been relatively large for such equipment, and the depreciation costs involved have also been relatively high. In addition, the different types of polymeric material which have been utilizable in such hot co-extrusion and related techniques have been relatively limited. Moreover, in some polymeric materials the utilization of heat has tended to degrade the desirable physical properties of such polymeric materials.

In the method and apparatus techniques of the present invention involving cold plasma lamination of two or more polymeric sheets, a number of advantages have been realizable over prior art techniques. One such advantage is that many different types of polymeric materials can be readily combined to form laminate materials having a wide variety of hybrid characteristics, as compared with the prior art. In addition, the energy utilization required in such systems of such cold plasma lamination techniques has been relatively low as compared with prior art systems, such as adhesive lamination and/or hot melt or hot co-extrusion techniques. Also, the cold plasma lamination methods and apparatus of the present invention are readily adaptable to more economical short production runs, and which have further involved relatively low scrap rates. Moreover, the use of solvents or monomers which would complicate bonding techniques and thereby reduce predictability and uniformity in the finished product, and which would also result in additional regulatory difficulties because of the utilization of such solvents or monomers, has been beneficially eliminated by means of the present invention.

Accordingly, and in view of the above deficiencies and difficulties with prior art techniques, methods, handling and application apparatus, it is an object of the cold plasma lamination methods and apparatus of the present invention to reduce materially such difficulties and deficiencies associated with such prior art techniques.

Additionally, it is an object of the cold plasma methods of the present invention to utilize cold plasma in exposing polymeric films thereto to effect adhesion between two such polymeric films.

It is an additional object of the cold plasma methods of the present invention to utilize very high voltage sources across the anode and cathode of the cold plasma reactor apparatus hereof, and in particular to utilize voltages in the approximate range of 180,000 to 500,000 volts.

It is also a further object of the cold plasma methods of the present invention to utilize pulses of very high frequency discharge, and in the radio wave frequencies, to activate such cold plasma, and in particular in preferred embodiments frequency pulses on the order of 12.56 megaHertz (12,560,000 cycles per second).

It is a yet further object of the cold plasma methods of the present invention to maintain such gaseous cold plasma in the reactive zone for treating such polymeric sheet material under pressures of approximately 1.1 Torr or greater in such reaction zone.

It is also a yet further object of the cold plasma methods of the present invention to utilize an approximately 1% to 2% noble gas in air mixture as the plasma medium, and to utilize argon gas in such concentrations in some preferred embodiments due to its superior plasma formation characteristics and relatively lower cost.

It is yet another object of the cold plasma methods of the present invention to automatically control the power to the electrode and the pressure in the reactor relative to one another, and in particular to do so by means of an adiabatic pressure valve to function to minimize pressure changes and automatically to vary power in response to voltage variation at the anode, which variation results from changes in pressure.

In addition to the above, it is a material object of the cold plasma reactor apparatus of the present invention to provide a pressurized plasma chamber substantially and/or relatively sealed on one side and defining one side of such chamber by means of the moving polymeric film which is simultaneously being treated by the plasma, and especially by means of the use of a rolling anode comprising a conductive roller to force the polymeric film down against the chamber end walls to form such plasma chamber.

Moreover, it is a material object of the cold plasma reactor apparatus of the present invention to utilize insulating ingress and egress rollers on either side of the plasma chamber forming walls and also on either side of such conductive roller to facilitate movement of the film over the chamber forming walls and into and away from such conductive roller.

It is also a material object of the cold plasma reactor apparatus of the present invention to utilize very sharp edged, thin cathodes, such as for example razor blade-like cathodes, to serve to generate such gaseous cold plasma.

It is a yet further additional material object of the cold plasma reactor apparatus of the present invention to utilize two spaced and elongated rows of such razor thin cathodes on either side of gas inlets for the plasma generating gaseous medium to insure an evenly pressurized zone of plasma between the two rows of such razor thin cathodes.

It is a yet further additional supplemental material object of the cold plasma reactor apparatus of the present invention to utilize selectedly and preferably uniformly gaseous medium inlets in the cathode frame to feed the plasma generating gaseous medium, preferably comprising an argon in air mixture, to the plasma treatment chamber.

Further additional material objects of the cold plasma methods and apparatus of the present invention will become known to those of ordinary skill in the art upon the review of the following summary of the invention, brief description of the drawing, detailed description of preferred embodiments, appended claims and accompanying drawings.

SUMMARY OF THE INVENTION

The present invention is directed in one aspect thereof to various methods for laminating at least two polymeric sheets into a laminate composite having improved properties. A broad embodiment of such inventive method comprises a first step of providing a first sheet of polymeric material, and thereafter exposing a surface thereof to gaseous cold plasma to activate the surface thereof. Such activation is effectuated by the formation of free radicals on the surface thereof. Next, the activated surface of such first sheet is disposed into intimate proximity with a second sheet of polymeric material, and then the two sheets are pressed together, thereby to form a laminated composite, and to do so in the absence of any substantial heating of either sheet, and without the application of a separate adhesive to either of such sheets.

In addition to the above methods, the present invention is also directed to a reactor apparatus for activating the surface of a first sheet of polymeric film material to form free radicals thereon, essentially utilizing the methods as described above. Such reactor apparatus includes a cold plasma generating cathode and anode disposed in respective spaced proximity with respect to the surface of the first sheet of polymeric material to be treated. Means for flowing a stream of cold plasma generatable gaseous medium past the cold plasma generating cathode are provided. Means are further provided for effectuating relative movement between such cathode and the surface of the first sheet of polymeric material for exposing a substantial portion of the surface of such first sheet to such cold plasma.

In some of its more specific embodiments, the above cold plasma reactor apparatus includes a preferably pressurized cold plasma chamber which is defined by and substantially relatively sealed on one side thereof by the moving polymeric film which is simultaneously being treated by the plasma. In such preferred embodiments, a rolling anode in the form of a conductive roller is utilized to urge the treated film downwardly against the non-conductive chamber forming walls. In such preferred embodiments non-conductive ingress and egress rollers are disposed on opposite sides of such conductive roller to urge the film to be treated over such treatment chamber for treatment thereof by such cold plasma contained with such chamber.

Further aspects of the cold plasma methods and apparatus are described in greater detail, infra.

BRIEF DESCRIPTION OF THE DRAWING

The cold plasma methods and apparatus of the present invention are set forth in the accompanying drawing, and in which:

FIG. 3 is a partial and fragmented longitudinal cross-sectional view taken along jogged lines 3—3 of FIG. 2 and depicting generally a longitudinal cross-sectional view through the conductive anodic roller as shown in FIG. 2, and specifically showing a longitudinal cross-sectional view through the electrical terminal, and further showing in the central portion of FIG. 3 a longitudinally extending cathode holder having therein the longitudinally extending conductive cathode bodies comprising upwardly positioned razor blade bodies disposed in proximity to such conductive roller and forming a treatment chamber therebetween, as depicted more particularly in FIG. 6, with the right hand portion of FIG. 3 shown in jogged section and depicting the securement means in the form of cathode bolts for securing such razor blade-like cathode bodies to such cathode holder in paired and spaced elongated, longitudinally extending array;

FIG. 6 is a transverse cross-sectional view of the reactor apparatus of the present invention taken along lines 6—6 of FIG. 3, and showing the conductive anodic roller and such non-conductive rollers, with the defined pressurized plasma chamber snugly covered on one side thereof by means of the moving polymeric film moving in direction of Arrows A,A from right to left, and as contacted and urged downwardly against the non-conductive chamber defining end walls by means of such conductive roller, with such conductive roller being supplied with electromagnetic energization in the radio wave frequencies by means of a contact spring, disposed onto a commutator ring, and further depicting a pair of razor blade-like conductive cathode bodies supported and carried by a cathode holder and having a trough therebetween for flow of the gaseous cold plasma medium therethrough past such cathode bodies to form a cold plasma for contacting such polymeric film material, with such cold plasma flowing into the cold plasma containing chamber and exiting downwardly therefrom through such cold plasma exiting chambers for removal therefrom;

DETAILED DESCRIPTION OF PREFERRED EMBODIMENTS

The present invention is directed to both apparatus and methods for the utilization of cold plasma techniques in laminating at least two polymeric sheets, without the use of any substantial heat which might cause a degradation of the structure of such polymeric sheets and thus result in a diminution of the physical properties and desirable characteristics thereof, and also without the use of any separate adhesive material.

The cold plasma reactor methods and apparatus of the present invention are specifically directed to activating the surface of a first sheet of polymeric film material to form free radicals thereon for effecting adhesion with a second sheet of polymeric sheet material.

The cold plasma reactor apparatus of the present invention in a broad embodiment thereof comprises cold plasma generating cathode and anode respectively disposed is spaced proximity with the first sheet of polymeric material. Means are providing for flowing a stream of a cold plasma generateable gaseous medium past the cold plasma generating cathode. In addition thereto, sheet transporting means for effectuating relative movement between the cathode and the treated surface of the first sheet of polymeric film material for exposing a substantial portion of the surface of such first sheet to such cold plasma is further provided. Such cold plasma reactor includes cathode means which are disposed and spaced at a selected distance from one side of the first sheet of polymeric material. In such embodiments, the accompanying anode is disposed also in selected spaced array from the opposite side of such first sheet, and in certain preferred embodiments in contact with such opposite side thereof.

In these preferred embodiments, the cathode comprises a pair of conductive cathode bodies projecting towards the adjacent surface of the first sheet. Such conductive cathode bodies may preferably comprise a pair of elongated elements which extend in a longitudinal direction. Such elongated pair of cathode bodies are preferably disposed substantially parallel to each other along the longitudinal extent thereof. The conductive cathode bodies as described hereinabove have a substantially sharp terminal edge facing the surface of the first sheet of polymeric material to be treated with the cold plasma. Each of such pair of upwardly projecting cathode bodies is also preferably substantially thin, and in preferred embodiments such conductive cathode bodies may comprise a plurality of razor blade bodies disposed end-to-ed and with the sharpened edge portion thereof disposed upwardly and toward such surface of such first sheet.

The means for flowing a stream of the cold plasma generatable gaseous medium is disposed in preferred embodiments to provide flow of such gas in a stream between the pair of conductive cathode bodies.

The above means for effectuating relative movement between the cathode and the treatment surface of the first sheet preferably comprises at least one conductive roller disposed opposite the cathode. The conductive roller extends in a longitudinal direction, and in such preferred embodiments the conductive roller also comprises the anode.

Also included in preferred embodiments of the cold plasma reactor apparatus of the present invention is a cathode housing means for defining a cold plasma containing chamber. Such cold plasma containing chamber has the cathode disposed therein. Such cathode housing defines the cold plasma containing treatment chamber, and which treatment chamber extends longitudinally, and essentially parallel with the longitudinal dimension of the conductive anodic roller. Thus, the cold plasma containing, or treatment, chamber is defined by such cathode housing walls and is formed of an insulator material, and has a mouth at one end thereof for disposition of the first sheet of polymeric material thereacross to form a substantial relative seal of the chamber by means of the first sheet of polymeric material. Although such relative seal in preferred embodiments is sufficient to permit some pressurization of such chamber, other alternative embodiments do not require a seal, but rather comprehend such polymeric material as constituting a not substantially sealing cover means for the end of such chamber.

In such preferred embodiments, the first sheet of polymeric material is transported across the mouth of the cold plasma containing chamber while simultaneously substantially maintaining the relative seal on such chamber to prevent substantial loss of cold plasma from the cold plasma containing chamber, and wherein the treatment surface of the first sheet of polymeric film material faces the cathode within the chamber and is accordingly exposed to such gaseous cold plasma.

At least one, and preferably two, non-conductive roller(s) are disposed in spaced array from the conductive roller to assist in effectuating such relative movement between the cathode and the treatment surface of the first sheet of polymeric material in preferred embodiments by functioning as a transporting roller for such first sheet. Such non-conductive rollers are each disposed in spaced array generally on opposite sides of the conductive roller to assist in such relative movement, and in particular to form an ingress roller and an egress roller for transporting such polymeric sheet into such cold plasma reactor, across the cold plasma containing chamber, and out of such cold plasma reactor. In such preferred embodiments, each of the non-conductive rollers is disposed for contact with one surface of the first sheet of polymeric material, and preferably the treatment surface, and the conductive roller is disposed for contact with the opposite surface thereof.

In the above preferred embodiments, the cathode bodies are carried by a cathode frame. Means for flowing a stream of the cold plasma generatable gaseous medium between the pair of elongated conductive cathode bodies comprises a plurality of substantially evenly spaced gaseous medium inlets disposed in longitudinal array in the cathode frame. Such evenly spaced gaseous inlets open within a longitudinally extending trough formed in the cathode frame and between the longitudinally extending, elongated, and evenly spaced cathodes. Thereby, such cathodes in conjunction with the associated trough spaced therebetween function together to maintain the pressure of the gaseous medium at a substantially equal level over the longitudinal dimension of the elongated cold plasma containing chamber.

Also, in preferred embodiments of the cold plasma reactor apparatus of the present invention, pressurization means for pressurizing the cold plasma containing chamber are provided. Such pressurization means may preferably comprise means for substantially providing continuous gas flow to the cold plasma containing chamber. Means for substantially continuously removing gas from the cold plasma containing chamber to provide a constant flow thereof are also provided. Such means further function substantially to diminish leakage of the gas from the chamber, and may further function to reclaim such gaseous medium for reuse.

The above cathode frame further includes at least one internal channel extending longitudinally along the length thereof for supplying gas to the plurality of gaseous inlets which are substantially evenly spaced along the length of the cathode frame. Such cathode frame is dimensioned to fit snugly and removably within the cathode housing along the respective longitudinal dimensions thereof. In such preferred embodiments, such cathode housing defines the cold plasma containing chamber and includes a longitudinally extending slot in the wall thereof opposite the first sheet, into which slot the longitudinally extending pairs of cathodes are disposed to project into the cold plasma containing chamber, and to provide the gaseous medium to such cold plasma containing chamber from the trough disposed between the pair of elongated cathode bodies.

As set forth in the description hereof, the above cold plasma reactor apparatus provides examples of apparatus suitable for carrying out the cold plasma techniques and methods of the present invention for laminating at least two polymeric sheets into a composite having improved and/or hybrid properties. Such methods comprise in certain broad embodiments thereof the steps of first providing a first sheet of polymeric material; next, exposing the surface of the first sheet of polymeric material to cold plasma to activate the surface thereof; and finally, disposing such activated surface of the first sheet into intimate proximity with the second sheet of polymeric material and pressing such first sheet and second sheets together to effect adhesion therebetween, to form a laminated composite in the absence of any substantial heating of either of such sheets and without application to either of such sheets of a separate adhesive.

In the inventive cold plasma methods of the present invention, such first and second and/or further polymeric sheets may be composed of different polymeric materials. At least one of such first sheet and such second sheet may be maintained in rolled form prior to such laminating to form such composite. After such laminating, such laminating composite is preferably also wound into rolled form for convenience of transportation and storage.

The cold plasma utilized in the methods of the present invention preferably comprises cold argon plasma. Such cold argon plasma is generated in preferred embodiments by application to a gaseous mixture of approximately at least one percent to two percent argon, or other inert gas, in air of an electromagnetic energy discharge of at least approximately 180,000–500,000 volts, such gaseous mixture preferably comprising a stream of such gaseous material and which preferably comprises argon. The cold plasma utilized in the methods of the present invention is generated by application of electromagnetic energy of a frequency in the radio wave length to the inert gas. Such radio frequency discharge is carried out at approximately the frequency of 12.56 megaHertz. The cold plasma is also preferably maintained at a selected pressure of approximately at least 1.1 Torr during such treatment by such cold plasma of such first sheet. In some preferred embodiments of the method of the present invention, the pressure of the cold plasma and the voltage applied thereto may be individually controlled and maintained in proportional relationship to each other. In such methods, there may be preferably an inverse proportional relationship between the pressure of the cold plasma and the voltage applied thereto. Such inverse proportional relationship may be controlled automatically, such as for example by means of an adiabatic pressure valve, examples of which are known to those skilled in the pressure valve arts.

In certain preferred embodiments, the first sheet of polymeric material in such improved methods of the present invention is exposed to the cold plasma for a period of approximately less than approximately 5.0 milliseconds. Such first sheet is run through such cold plasma treatment chamber at a rate of approximately 500 feet per second. In the improved methods of the present invention, the cold plasma is generated by means of application of energy of a selected frequency to a gas wherein such gas has a flow rate of approximately at least 10 milliliters per second per linear meter onto the surface of such first sheet.

Figure 1:
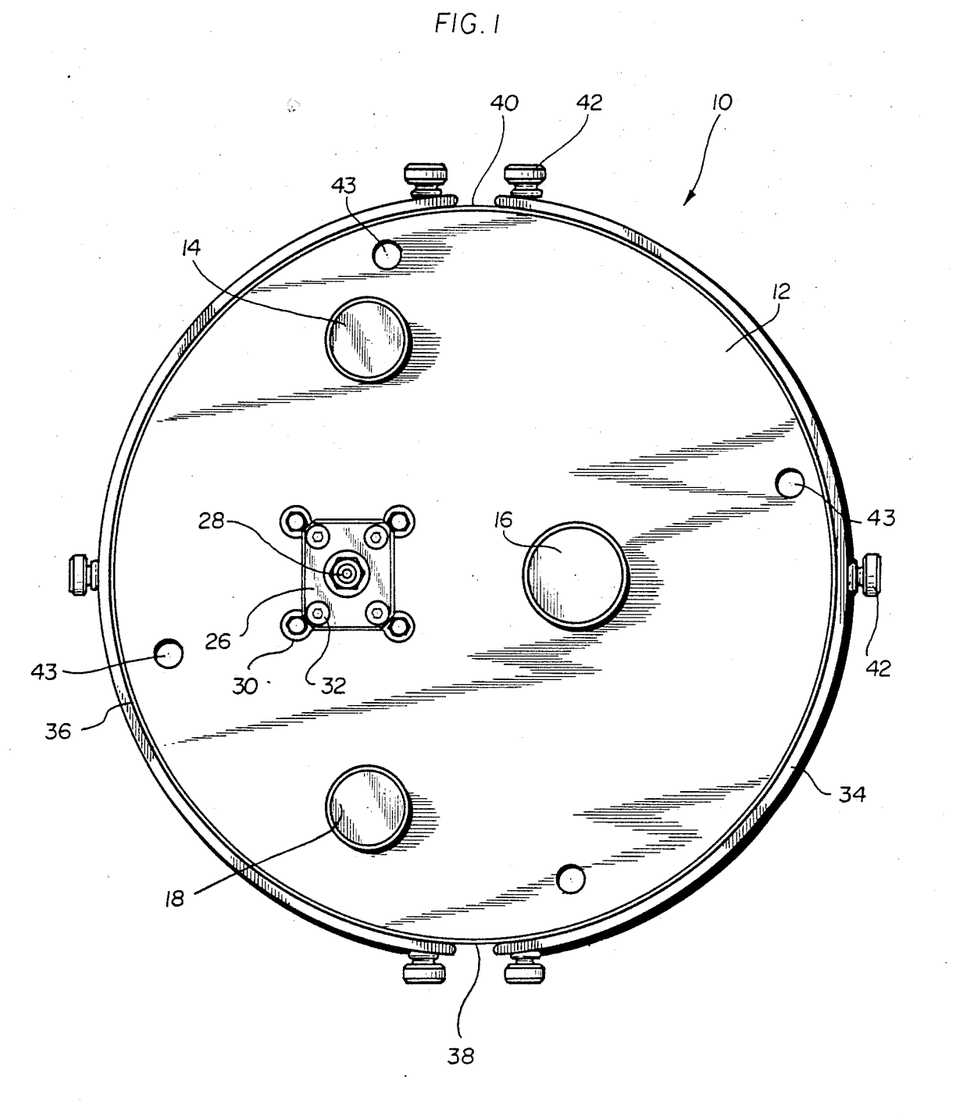
FIG. 1 is an end view of the leftside end plate of the cold plasma reactor apparatus of the present invention, depicting the three axes of rotation of the various rollers, with the conductive roller comprising the anode disposed between the two non-conductive rollers, and further depicting the cover for the electrical terminal disposed generally between such non-conductive roller axes, and yet further showing the reactor covers which are hemispherically shaped in cross section with ingress and egress openings respectively located at the bottom and top respectively thereof in FIG. 1, and with such reactor covers maintained and secured thereon by means of multiple thumb screws.
Figure 2:
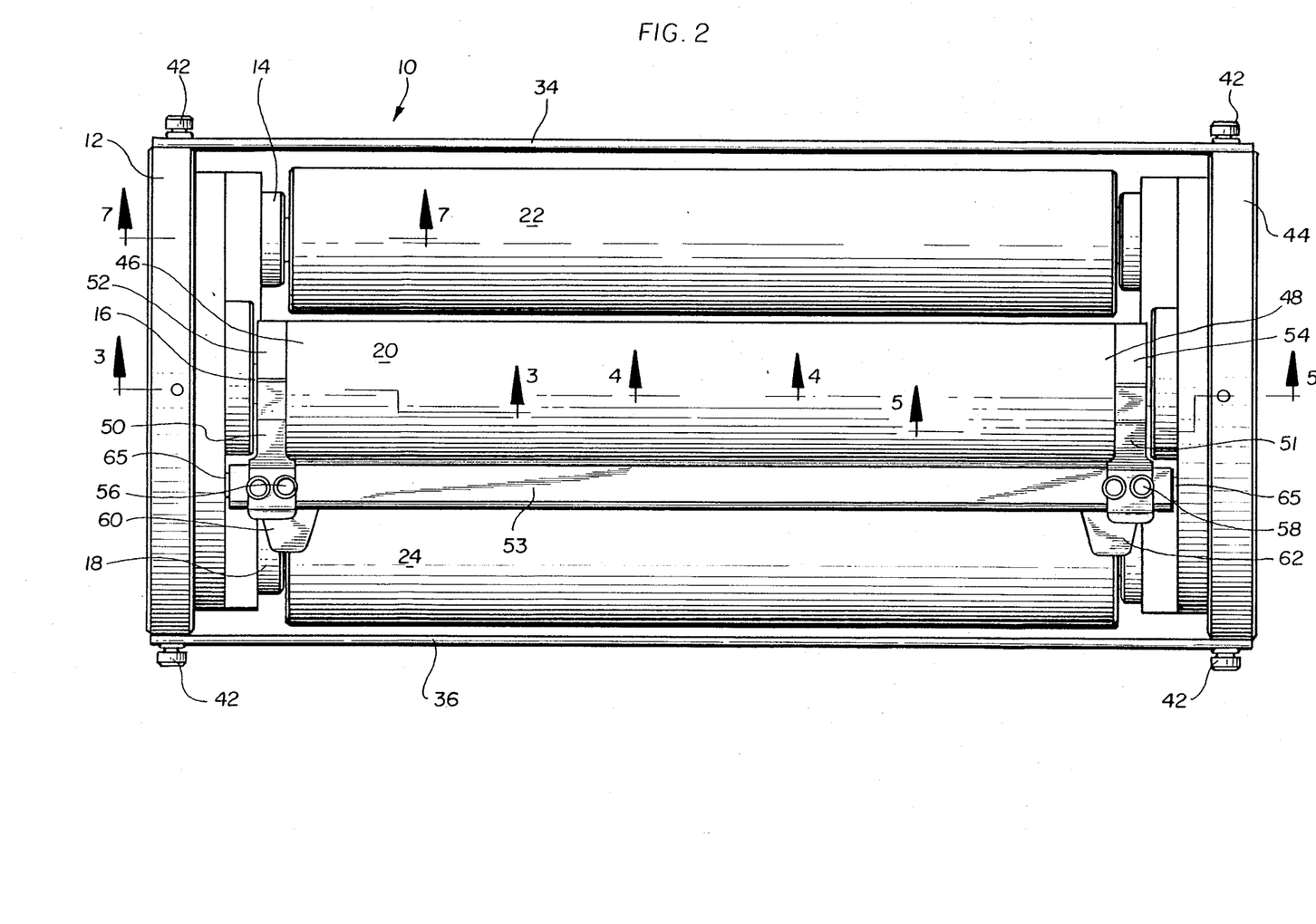
FIG. 2 is a partially fragmented longitudinal cross-sectional view of the reactor apparatus as shown in FIG. 1, and further shows left and right side end plates having means therein for journaling for rotation a pair of non-conductive transport rollers disposed on either side of a conductive anodic roller, the end portions of which anodic roller each includes a spring-loaded electrical contact connecting the power source and the commutator rings disposed at each end and around the conductive roller, with such commutator rings supported by a removable elongated support bar running essentially parallel to the conductive anodic roller.

Referring now to the drawing and to FIGS. 1 and 2 in particular, wherein illustrative embodiments of the cold plasma apparatus generally 10 are shown, left side end plate 12 includes therein the three axes of rotation 14, 16, 18 for the respective journals for rollers 20,22,24, as shown in FIG. 2. In particular, conductive roller 20 comprising the anode is disposed between the two non-conductive rollers 22,24. FIG. 1 further depicts the cover plate 26 for the electrical terminal 28, and which is secured by means nylon cap screws 30, and stainless steel cap screws 32. Such cover plate 26 is disposed generally between such non-conductive roller axes 14,18. FIG. 1 further shows the reactor covers 34,36 which are hemispherically shaped in cross-section with ingress and egress openings 38,40 respectively located at the bottom and top respectively thereof, and with such reactor covers 34,36 maintained and secured thereon by means of thumb screws 42. Tapped screw holes 43 are provided for securing reactor apparatus 10 to externally associated frame and support means (not shown) for positioning in proper relationship with the various rolls of sheet material stock and the roller(s) for the composite laminate in its various stages of formation.

Figure 6:
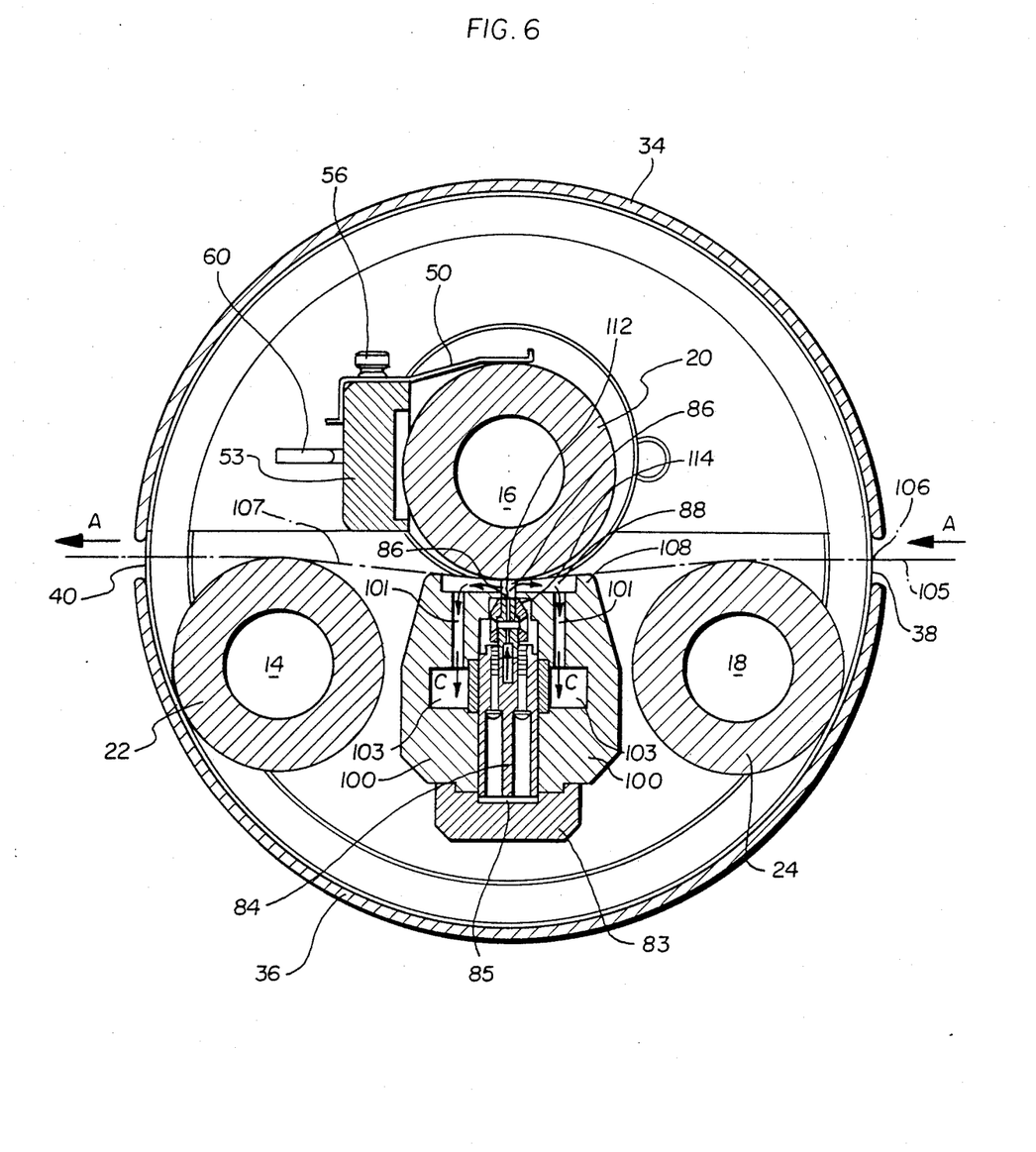

FIG. 2 shows left side and right side end plates 12,44, which hold means thereon for journaling for rotation the pair of non-conductive rollers 22,24 disposed on either side of the conductive anodic roller 20. The respective end portions 46,48 of anodic roller 20 include spring-loaded electrical clips 50,51 for contacting commutator rings 52,54 to provide electrical contact between the power source (not shown) and the commutator rings 52,54 disposed at each respective end 46,48 and around the conductive, anodic roller 20. Such electrical clips 50,51 are secured by means of thumb screws 56,58 to a removable electrical clip support bar 53 which extends longitudinally across the length of reactor apparatus 10, as shown in FIG. 2 and in cross section as shown in FIG. 6. FIG. 2 further illustrates spring-loaded grips 60,62 for holding such clip support bar 53, the structure and functioning of which are shown in greater detail in FIG. 7, as described, infra.

Figure 3:
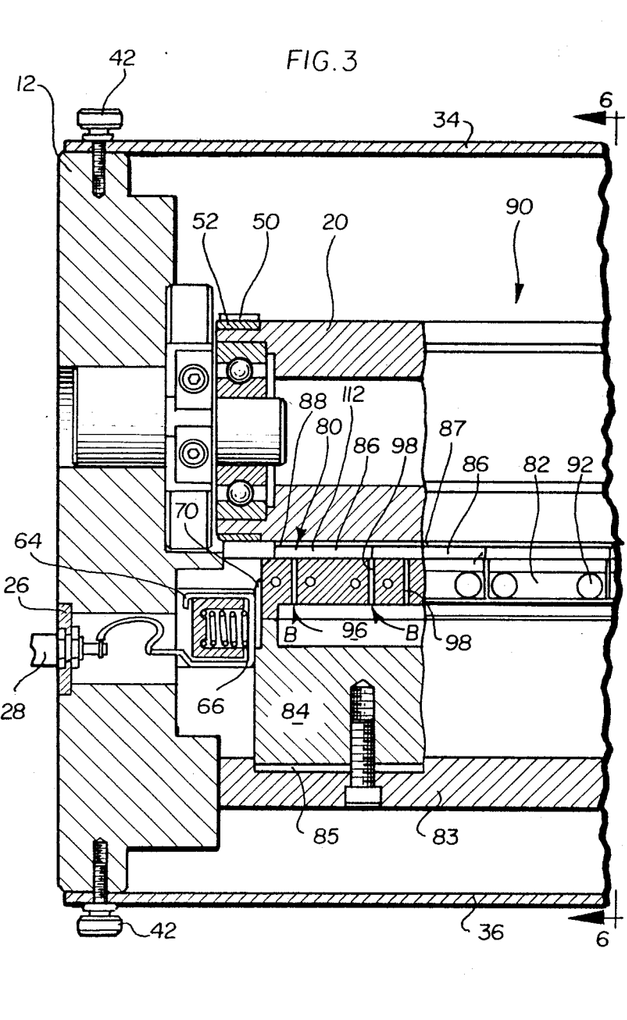

FIG. 3 shows electrical terminal 28 connected to electrical contact 64 and to spring 66 for insuring contact with cathode contact 70 which is connected to the cathode generally 80 by means of cathode connector plates 82. Cathode 80 is supported by a longitudinally extending cathode frame 84 having supported thereon the longitudinally extending conductive cathode bodies 86,87 comprising a plurality of end-to-end positioned, upwardly directed razor blade bodies, the sharp edges of which are disposed in proximity to such conductive roller 20 and forming a treatment chamber 88 therebetween, as depicted more particularly in FIG. 6. In the jogged right hand portion of FIG. 3 generally 90, securement means in the form of cathode bolts 92 for securing such razor blade cathodes 86 to such cathode frame 84 are shown. Cover bar 83 and shim 85 in FIGS. 3,4,5 and 6 are secured to and under cathode frame 84 by bolts 85, and to cathode holder 100 by bolts 87, as shown in FIG. 5, to hold cathode bodies 86 in functional position.

Figure 4:
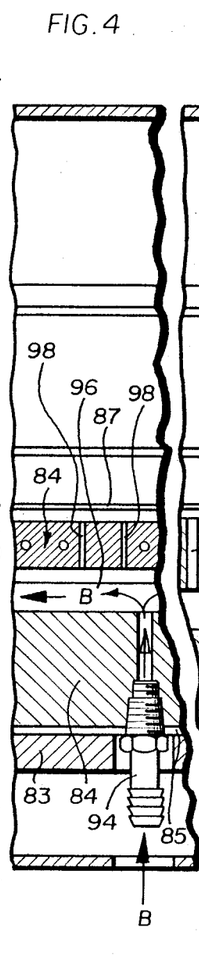
FIG. 4 is a partial longitudinal cross-sectional view of the cold plasma reactor apparatus of FIG. 2 taken along lines 4—4 of the central portion thereof, and showing the gas inlet for a longitudinally disposed gaseous supply conduit and the uniformly apertured cathode frame for carrying such cathode bodies and for uniformly distributing such gaseous medium upwardly into the cold plasma chamber.

In FIG. 4 gas inlet 94 for supplying the gaseous medium from an external source (not shown to) longitudinally disposed gaseous supply conduit 96 is shown for in turn providing the gaseous plasma medium to gaseous inlets 98 in cathode holder 84 which also carries such cathode bodies 86. Such gaseous inlets serve to uniformly distribute such gaseous medium upwardly into the cold plasma chamber 88, as shown by the path of Arrows B,B in FIGS. 3 and 4.

Figure 5:
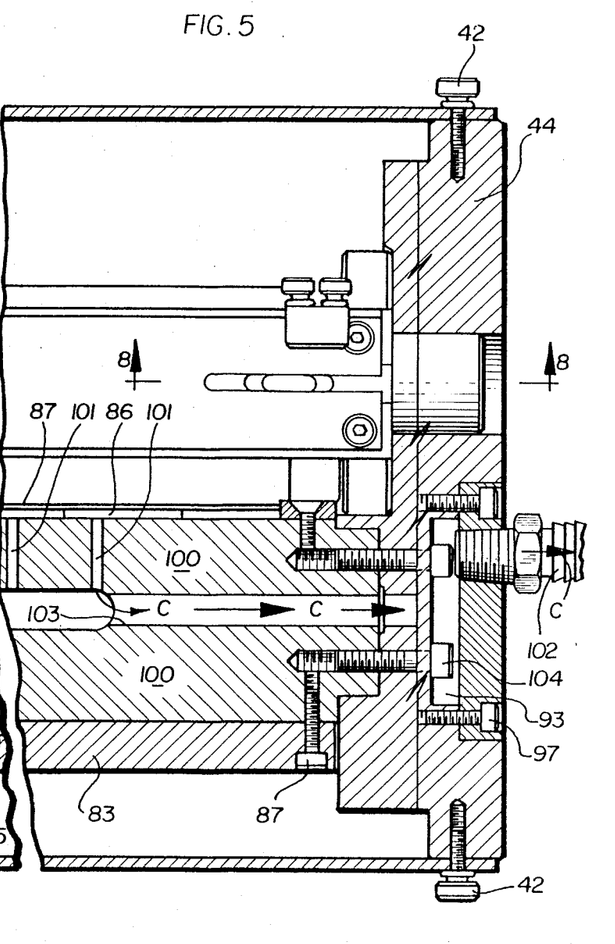
FIG. 5 is a partial longitudinal cross-sectional view of the right side of the cold plasma reactor apparatus as shown in FIG. 2 and taken along jogged lines 5—5 thereof, and further showing and depicting the means for continuously removing the gaseous cold plasma from the treatment chamber, as shown more particularly in FIG. 6 in transverse cross-section, and also the cathode holder for supporting the cathode frame and the bolt means ffor securing the cathode holder to the right side and frame, and the bolt means for securing the cathode holder to the bottom disposed cover bar for the cathode frame.

FIGS. 5 and 6 depict cathode holder 100 of the cold plasma reactor apparatus 10 which contains means for continuously removing the gaseous cold plasma from reactor appaaratus 10 in the path as shown at Arrows C,C in FIGS. 5 and 6 through vacuum outlet 102. In particular, cathode holder 100 includes downwardly directed gaseous medium exhaust channels 101,101, which in turn feed into horizontally directed gas exit passages 103,103 eventually to exit reactor 10 through vacuum outlet 102. Exit passages 103,103 lead into and communicate with a single exhaust collection chamber 93 defined by an end cap 95 covering an aperture cut into right side end plate 44, which end cap 75 is secure to end plate 44 by bolts 97. Such cathode holder 100 is secured to each end plate 12,44 by means of screws 104, as shown in FIG. 5.

As shown particularly in FIG. 6, cathode housing 100 includes upwardly extending walls 108 for defining cold plasma containing chamber 88. Such cold plasma containing chamber 88 has the cathode bodies 86 disposed therein. Such cathode housing 100 thus defines the cold plasma containing treatment chamber 88, and which treatment chamber 88 extends longitudinally, and essentially parallel with the longitudinal dimension of conductive roller 20 as shown in FIGS. 3–5. Cold plasma containing, or treatment, chamber 88 comprising housing walls 108 formed of an insulator material has a mouth at one side thereof, which is the tope side as shown in the embodiment of FIG. 6, for disposition of the first sheet 106 of polymeric material thereacross to form a substantial relative sealing of chamber 88 by means of the first sheet 106 of polymeric material covering and disposed across such mouth of chamber 88. In such preferred embodiments, the first sheet 106 of polymeric material is transported across the mouth of cold plasma containing chamber 88 in the direction of Arrows A,A while simultaneously substantially maintaining the seal on such chamber 88 to prevent substantial loss of cold plasma from the cold plasma containing chamber 88, and wherein the treatment surface 105 of the first sheet 106 of polymeric film material faces cathode bodies 86 within chamber 88 and is exposed to such gaseous cold plasma.

As shown in FIG. 6, each of non-conductive rollers 22,24 is disposed is spaced array from conductive roller 20 to assist in effectuating such relative movement between cathode bodies 86 and the treatment surface 105 of the first sheet 106 of polymeric material in preferred embodiments by functioning as a transporting roller for such first sheet 106. Such non-conductive rollers 22,24 are each disposed in spaced array generally on opposite sides of conductive roller 20 to assist in such relative movement and in particular to form an ingress roller 24, and an egress roller 22 for transporting such polymeric sheet 106 into such cold plasma reactor 10 at ingress 38 across the cold plasma containing chamber 88, and out of such cold plasma reactor 10 at egress 40. As shown in FIG. 6, in such preferred embodiments each of non-conductive rollers 22,24 is disposed for contact with treatment surface 105 of the first sheet 106 of polymeric material, and conductive roller 20 is disposed for contact with the opposite surface 107 thereof.

In the above preferred embodiments as shown in FIG. 3, cathode bodies 86 are attached to, and carried and supported by cathode frame 84. Means for flowing a stream of the cold plasma generatable gaseous medium between the pair of elongated conductive cathode bodies 86,86 as shown best in FIG. 6 comprises a plurality of substantially evenly spaced gaseous medium inlets 98,98 as shown in FIGS. 3–4, and which are disposed in upwardly directed longitudinal array in cathode frame 84. Such evenly spaced gaseous inles 98 open within a longitudinally extending trough 112 formed in cathode frame 84 and between the longitudinally extending, elongated, and evenly spaced cathode bodies 86. Thereby, because off such uniform dimensions and spacing, such cathode bodies 86 in conjunction with associated trough 112 spaced therebetween function together to maintain a uniform volume for such gaseous medium and thereby to maintain the pressure of the gaseous medium at a substantially equal level over the longitudinal dimension of the elongated cold plasma containing chamber 88.

Also, in preferred embodiments of the cold plasma reactor apparatus 10 of the present invention, pressurization means for pressurizing the cold plasma containing chamber are provided. Such pressurization means may preferably comprise means for substantially providing continuous gas flow to the cold plasma containing chamber 88 as shown in FIG. 4 by means of gaseous medium inlet 94. Means for substantially continuously removing gas from cold plasma containing chamber 88 to provide a constant flow thereof are also provided as shown in FIGS. 5–6. Such means further function substantially to diminish leakage of the gas from the chamber, and may further function to reclaim such gaseous medium for reuse.

Cathode frame 84 further includes at least one internal channel comprising gaseous supply conduit 96 extending longitudinally along the length thereof for supplying such gaseous plasma medium to the plurality of gaseous inlets 98 which are substantially evenly spaced along the length of cathode frame 84. Such cathode frame 84 is dimensioned to fit snugly and removably within the cathode housing 100 as shown in FIG. 6 along the respective longitudinal dimensions thereof. In such preferred embodiments, such cathode housing 100 defines the cold plasma containing chamber 88 and includes a longitudinally extending slot 114 in the wall thereof opposite first sheet 106 into which slot the longitudinally extending pairs of cathode bodies 86,86 are disposed to project into the cold plasma containing chamber 88, and to provide the gaseous medium to such cold plasma containing chamber 88 from trough 112 disposed between the pair of elongated cathode bodies 86,86.

Figure 7:
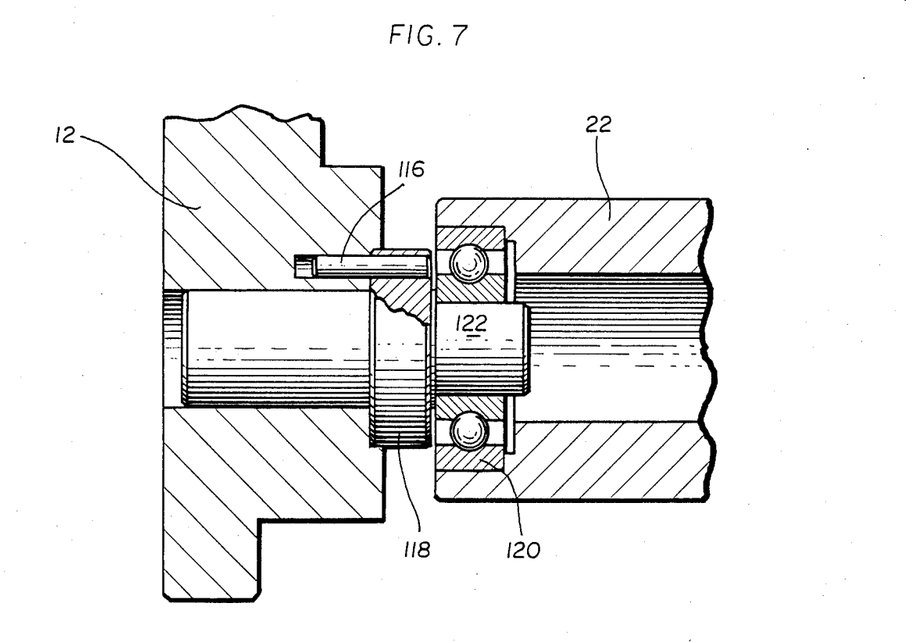
FIG. 7 is a partial longitudinal cross-sectional view taken along lines 7—7 of FIG. 2 and showing the non-conductive roller thereof journaled for rotation and with an anti-rotational pin connected thereto for securing the journal against the tendency to rotate.

Referring now to FIG. 7, the anti-rotational mechanism for preventing rotation of the journal for non-conductive roller 22 is depicted, and comprises a non-rotational pin 116 which interconnects rotational journal holder 118 with left side end plate 12. As depicted, roller bearings 120 are disposed on non-conductive roller 22 for rotation thereof about shaft 122.

Figure 8:
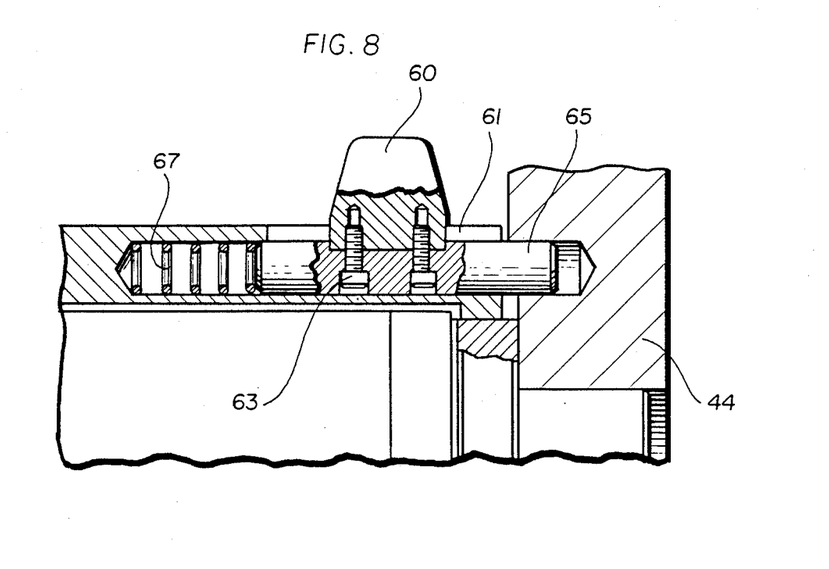
FIG. 8 is a cross-sectional view taken along lines 8—8 of FIG. 5 and further showing the details of the spring loaded grip and locking mechanism for the removable clip support bar.

FIG. 8 depicts the grip and locking mechanism for the contact springs 50 and includes a slideable grip 60 which is slideable within slot 61 and is connected by screws 63,63 to a locking bar 65 as disposed within right side end plate 44 and as urged by coil spring 67. Thus, the functioning of grip 60 is to permit removal of bar 53 which functions to hold contact springs 50,51.

The above methods and apparatus may be utilized in several variations and alternative embodiments. Specifically, the above laminate may comprise two layers, one of which comprises a sealant layer, and the other which comprises a barrier layer. Such sealant layer may comprise a polyolefin, such as for example polyethylene. The barrier layer may comprise polyvinyledine chloride, polyvinyl alcohol, polyacrylonitrile, etc. In other embodiments, the barrier layer may be sandwiched between two such sealant polymer layers. Also in yet other embodiments of the invention hereof, such laminate may form a primary web, which may then be further joined to a secondary and non-laminated web. In yet other embodiments, the above laminate may be joined on both sides thereof by separate secondary non-laminated webs. In the above embodiments, the secondary web may comprise a heavier gauge plastic sheet, such as high density polyethylene, polyvinyl chloride, polyacrylonitrile, polyethylene teraphthalate, nylon, polyurethanes, polystyrenes, polyvinylidene chloride, acrylonitrile, and/or other suitable polymers.

Other gases useful for generating such cold plasma may comprise nitrogen, helium, xenon, krypton, neon, and/or other inert gases.

Various different materials may be utilized as and for the elements of the cold plasma reactor apparatus of the present invention. The conductive roller may preferably comprise stainless steel. The contact springs and the commutator rings may comprise phosphor bronze. The various thumb screws may be formed from brass or nylon. The plate cover may also preferably comprise stainless steel, as does the compression spring. The connector screws may comprise stainless steel, brass, etc. The cathode bodies may preferably comprise one half of double-edged stainless steel razor blades, and preferably with platinum coating, as produced, for example, under the Schick® trademark by Warner Lambert Company of Morris Plains, New Jersey.

Most of the non-conductive structural materials, such as the right and left side end plates, the non-conductive rollers, the cathode frame, the cathode housing, etc. may be formed from a high density polymeric material sold under the trademark Delrin® produced by E. I. Dupont Company of Wilmington, Del.

The ball bearings contained within the journal for the non-conductive rollers preferably comprise a nonmetallic material, such as nylon orfoss. The male connector for the gas input is preferably formed from black polyethylene, as is the male connector for the vacuum suction. Cap screws and other screws which are not subjected to large amounts of force may be formed of nylon.

The basic and novel characteristics of the improved methods and apparatus of the present invention will be readily understood from the foregoing disclosure by those skilled in the art. It will become readily apparent that various changes and modifications may be made in the form, construction and arrangement of the improved apparatus of the present invention, and in the steps of the inventive methods hereof, which various respective inventions are as set forth hereinabove without departing from the spirit and scope of such inventions. Accordingly, the preferred and alternative embodiments of the present invention set forth hereinabove are not intended to limit such spirit and scope in any way.

What is claimed is:

1. A cold plasma reactor apparatus for activating a treatment portion of the surface of a first sheet of polymeric film material to form free radicals thereon for effecting adhesion with a second sheet of polymeric sheet material, said reactor apparatus comprising:
   a cold plasma generating cathode and an anode disposed in spaced proximity with such first sheet of polymeric material;
   means for flowing a stream of a cold plasma generatable gas past said cold plasma generating cathode;
   means for effectuating relative movement between said cathode and the surface of such first sheet of polymeric film material for exposing sequential treatment portions of the surface of such first sheet to such cold plasma; and
   cathode housing means disposed immediately adjacent said cold plasma generating cathode and containing therein sequential treatment portions of the first sheet of polymeric film material, said cathode housing means further defining a substantially closed cold plasma containing chamber, said cold plasma containing chamber further containing said cold plasma generating cathode and yet further containing means for applying the cold plasma directly and continuously to the treatment portion of the first sheet of polymeric film material.

2. The cold plasma reactor apparatus of claim 1 wherein said cathode is disposed in selected spaced array with respect to one side of such first sheet and the accompanying anode is disposed in selected spaced array from the opposite side of such first sheet.

3. The cold plasma reactor apparatus of claim 1 wherein said cathode comprises a pair of conductive cathode bodies projecting toward the adjacent surface of such first sheet.

4. The cold plasma reactor apparatus of claim 3 wherein said pair of conductive cathode bodies are each elongated and each of which extends in a longitudinal direction.

5. The cold plasma reactor apparatus of claim 3 wherein said pair of conductive cathode bodies are disposed substantially parallel to each other.

6. The cold plasma reactor apparatus of claim 3 wherein each of said pair of projecting conductive cathode bodies is substantially thin.

7. The cold plasma reactor apparatus of claim 3 wherein said conductive cathode bodies have a substantially sharp terminal edge facing the surface of such first sheet to be treated with the cold plasma.

8. The cold plasma reactor apparatus of claim 3 wherein said conductive cathode bodies comprise a portion of at least one razor blade body.

9. The cold plasma reactor apparatus of claim 3 wherein said means for flowing a stream of a cold plasma generatable gas is disposed to provide such gas in a stream between said pair of conductive cathode bodies.

10. The cold plasma reactor apparatus of claim 1 wherein said means for effecting relative movement between said cathode and the surface of said first sheet comprises at least one conductive roller disposed on the opposite side of the first sheet from said cathode.

11. The cold plasma reactor apparatus of claim 10 wherein said conductive roller extends in a longitudinal direction.

12. The cold plasma reactor apparatus of claim 11 wherein said conductive roller comprises said anode.

13. The cold plasma reactor apparatus of claim 1 wherein said cathode housing means defining said cold plasma containing chamber extends longitudinally with respect to said conductive roller.

14. The cold plasma reactor apparatus of claim 13 wherein said cold plasma containing chamber comprises cathode housing walls formed of an insulator material.

15. The cold plasma reactor apparatus of claim 14 wherein said cold plasma containing chamber has a mouth at one end thereof for disposition of such first sheet thereacross to form a substantial closure for such chamber by means of such first sheet.

16. The cold plasma reactor apparatus of claim 15 wherein such substantial closure for such chamber is substantially sealing.

17. The cold plasma reactor apparatus of claim 1 wherein said first sheet moves across the mouth of said cold plasma containing chamber while simultaneously substantially maintaining an enclosure on such chamber to prevent substantial loss of cold plasma therefrom while the surface of such first film facing said cathode within said chamber is exposed to the cold plasma for treatment thereby.

18. The cold plasma reactor apparatus of claim 10 wherein at least one non-conductive roller is disposed in spaced array from said conductive roller to assist in effectuating such relative movement between said cathode and the surface of the first sheet.

19. The cold plasma reactor apparatus of claim 10 wherein a pair of non-conductive rollers is each disposed in spaced array generally on opposite sides of said conductive roller to assist in such relative movement.

20. The cold plasma reactor apparatus of claim 19 wherein one conductive roller is an ingress roller and the other conductive roller is an egress roller for such first sheet of polymeric material.

21. The cold plasma reactor apparatus of claim 19 wherein each of said non-conductive rollers is disposed on one surface of the first sheet and said conductive roller is disposed on the opposite surface thereof.

22. The cold plasma reactor apparatus of claim 3 wherein said cathode bodies are carried by a cathode frame.

23. The cold plasma reactor apparatus of claim 22 wherein said means for flowing a stream of a cold plasma generatable gas between said pair of conductive cathode bodies comprises a plurality of substantially evenly spaced gas inlets disposed in longitudinal array in said cathode frame.

24. The cold plasma reactor apparatus of claim 23 wherein said evenly spaced gas inlets open within a longitudinally extending trough formed on said cathode frame and between said longitudinally extending and evenly spaced cathodes thereby together to maintain the pressure of such gas substantially equal over such longitudinal dimension thereof.

25. The cold plasma reactor apparatus of claim 1 further comprising pressurization means for at least partially pressurizing said cold plasma containing chamber.

26. The cold plasma reactor apparatus of claim 25 wherein said pressurization means comprises means for substantially providing a continuous flow of gaseous medium to said chamber.

27. The cold plasma reactor apparatus of claim 1 further comprising means for substantially continuously removing gas from said chamber to provide a constant flow thereof, and substantially to diminish leakage of such gas from said chamber.

28. The cold plasma reactor apparatus of claim 23 wherein said cathode frame further comprises at least one elongated channel extending longitudinally along the length thereof for supplying gas to said plurality of gas inlets substantially evenly spaced along the length of said cathode frame.

29. The cold plasma reactor apparatus of claims 1 or 22 wherein said cathode frame is dimensioned to fit snugly and removably within said cathode housing means along the respective longitudinal dimensions thereof.

30. The cold plasma reactor apparatus of claim 1 wherein said cathode housing means defining said cold plasma containing chamber includes a longitudinally extending slot in the housing wall thereof opposite said first sheet, and said longitudinally extending pair of cathodes are disposed within said slot to project into said cold plasma containing chamber and to provide the gas to said chamber from said trough disposed between said pair of cathodes.

31. The cold plasma reactor apparatus of claim 1 wherein said cold plasma generating cathode includes aperture means disposed in immediate proximity to the treatment portion of the first sheet of polymeric film material for application of cold plasma directly thereonto.

32. The cold plasma reactor apparatus of claim 31 wherein said cold plasma generating cathode is disposed substantially perpendicular to the treatment portion of the first sheet of polymeric material.

33. The cold plasma reactor apparatus of claim 1 wherein said substantially closed cold plasma containing chamber is a positive pressure chamber.

* * * * *